United States Patent
Singh et al.

(10) Patent No.: US 8,942,708 B2
(45) Date of Patent: Jan. 27, 2015

(54) MANAGEMENT OF RADIO CONNECTION ASSIGNMENT IN COVERAGE AREA CORRELATED WITH GEOGRAPHIC REGION

(71) Applicant: Sprint Spectrum L.P., Overland Park, KS (US)

(72) Inventors: Jasinder P. Singh, Olathe, KS (US); Ashish Bhan, Shawnee, KS (US); Maulik K. Shah, Overland Park, KS (US); Jason P. Sigg, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/753,916

(22) Filed: Jan. 30, 2013

(65) Prior Publication Data
US 2014/0213262 A1    Jul. 31, 2014

(51) Int. Cl.
*H04W 36/00* (2009.01)
*H04W 36/32* (2009.01)
*H04W 76/04* (2009.01)

(52) U.S. Cl.
CPC ............ *H04W 36/32* (2013.01); *H04W 76/045* (2013.01)
USPC ............ 455/440; 455/436; 455/437; 370/331

(58) Field of Classification Search
None
See application file for complete search history.

(56) References Cited

U.S. PATENT DOCUMENTS

| | | | |
|---|---|---|---|
| 6,097,953 A | 8/2000 | Bonta et al. | |
| 6,266,529 B1 | 7/2001 | Chheda | |
| 7,076,245 B1 | 7/2006 | Satapathy | |
| 7,082,303 B2 | 7/2006 | Sayeedi et al. | |
| 7,133,675 B2 | 11/2006 | Hunzinger | |
| 7,136,636 B1 | 11/2006 | McLaughlin | |
| 7,349,699 B1 | 3/2008 | Kelly et al. | |
| 7,408,974 B2 | 8/2008 | Yarkosky | |
| 8,231,469 B1 | 7/2012 | Ford et al. | |
| 8,391,872 B1 * | 3/2013 | Shetty et al. | 455/443 |
| 8,588,807 B2 * | 11/2013 | Kumar | 455/456.1 |
| 2003/0134637 A1 | 7/2003 | Cooper | |
| 2005/0260990 A1 | 11/2005 | Huang et al. | |
| 2006/0203738 A1 * | 9/2006 | Fok et al. | 370/252 |
| 2007/0087752 A1 | 4/2007 | Voyer et al. | |
| 2008/0113670 A1 * | 5/2008 | Dufour et al. | 455/436 |
| 2009/0203394 A1 * | 8/2009 | Shaffer et al. | 455/525 |
| 2014/0031044 A1 * | 1/2014 | Mazzarella | 455/440 |

OTHER PUBLICATIONS

U.S. Appl. No. 10/935,884, filed Sep. 8, 2004.
U.S. Appl. No. 11/779,023, filed Jul. 17, 2007.
Office Action from U.S. Appl. No. 11/779,023, dated May 18, 2010.
Office Action from U.S. Appl. No. 11/779,023, dated Aug. 31, 2010.

* cited by examiner

Primary Examiner — Magdi Elhag

(57) ABSTRACT

A method, apparatus, and system for helping to manage advanced handoff to a coverage area based on correlation with a geographic region. A mobile station determines that it is in or approaching a defined geographic region, and the mobile station determines from correlation data that the geographic region is correlated with a particular cellular coverage area. The mobile station therefore requests handoff to the cellular coverage area and provides an advanced-handoff indication to cause the serving radio access network to maintain assignment of a radio connection in the coverage area longer than the network would normally, to help allow time for the mobile station to arrive at the coverage area and begin communicating on the radio connection with the network.

16 Claims, 5 Drawing Sheets

MANAGEMENT OF RADIO CONNECTION ASSIGNMENT IN COVERAGE AREA CORRELATED WITH GEOGRAPHIC REGION

BACKGROUND

Unless otherwise indicated herein, the materials described in this section are not prior art to the claims and are not admitted to be prior art by inclusion in this section.

A typical cellular wireless communication network provides a number of base stations throughout a region, with each base station radiating to define one or more cellular coverage areas such as cells and cell sectors. The base stations may then be coupled to various network infrastructure that operates to control base station operation and to provide connectivity with one or more transport networks such as the public switched telephone network (PSTN) or the Internet. With this arrangement, a mobile station (such as a cell phone or other wirelessly equipped device) positioned in any coverage area of the network may be served by the base station and in turn may engage in communication with other mobile stations or with various entities on the transport network(s).

In each coverage area of the network, the serving base station may broadcast a pilot signal, reference signal, or the like that may help to identify the coverage area and distinguish the coverage areas from others in the vicinity, and that mobile stations may monitor as a basis to detect and evaluate coverage. In practice, a mobile station may monitor these signals in an effort to detect the best available coverage and may choose to register with the system and operate in the best coverage area that it detects. Further, the mobile station may then continue to monitor these signals to determine when it would be appropriate to hand off from one coverage area to another, and the mobile station may then engage in signaling with the network to facilitate that handoff.

When operating in a coverage area, a mobile station may be in an idle mode or an active/connected mode. In the idle mode, the mobile station is not engaged in a call (e.g., voice call or data session) but may generally monitor overhead signaling from the serving base station in an effort to detect any page messages or other information of interest. In the active/connected mode, on the other hand, the mobile station has an assigned radio connection with the base station and may engage in a call via that radio connection. In both of these modes, the mobile station may also continue to monitor signals in its serving coverage area and in other coverage areas in an effort to identify the best coverage, and upon detecting sufficiently better coverage may work with the network to facilitate handoff.

Certain wireless systems also enable a mobile station to be served by multiple coverage areas at once. In such a system, the mobile station may have an "active set" of coverage areas in which the mobile station is active/connected, and the mobile station may communicate the same data simultaneously in all coverage areas of the active set. Advantageously with such an arrangement, the mobile station can engage in a "soft handoff" process, through which a sufficiently stronger coverage area is added to the active set in place of a weakest coverage area while the mobile station continues to communicate seamlessly on one or more other coverage areas of the active set.

When a mobile station is engaged in a call in the active/connected mode, if the mobile station loses communication with the network, the mobile station may experience a dropped call. This may happen if the mobile station is active/connected in a single coverage area and loses communication with the base station serving that coverage area, or if the mobile station is active/connected in multiple coverage areas at once and loses communication with the one or more base stations serving those coverage areas. In practice, when a mobile station experiences a dropped call, the mobile station may responsively scan for coverage once again and then transition to idle in a best available coverage area.

OVERVIEW

Disclosed herein is a method and corresponding apparatus or system to help facilitate successful handoff in a cellular wireless communication network. The method may help to address a scenario where a cellular wireless coverage area exists in a particular geographic region and a mobile station is programmed to associate that geographic region with the coverage area, such that when the mobile station detects that it is in or approaching the geographic region, the mobile station may request handoff to the coverage area. A mobile station may be programmed to operate in that way, for instance, in response to a determination that when the mobile station is in that geographic region the mobile station tends to operate in that cellular coverage area.

A problem with that scenario may arise if the coverage area does not span the entire geographic region and if the mobile station is not in range of the coverage area even if the mobile station is in the geographic region. With such an arrangement, if the network grants the mobile station's handoff request and assigns to the mobile station a radio connection in that coverage area, the mobile station would not yet be able to communicate on that radio connection. If too much time then passes without the network receiving any communication from the mobile station on that assigned radio connection, the network may then consider the handoff to have failed and may responsively release the radio connection.

In accordance with this disclosure, one way to help address this scenario is for the mobile station to provide the network with an advanced-handoff indication that causes the network to wait longer than the network would normally wait for communication from a mobile station on the newly assigned radio connection. In particular, if the network would normally release a radio connection assigned to a mobile station if the network does not receive communication over the mobile statin within a threshold period of time after first assigning the radio connection, the advanced-handoff indication may cause the network to maintain assignment of the radio connection to the mobile station for longer than the threshold period of time, to allow more time for the mobile station to actually move into range of the coverage area and begin communicating with the network on the assigned radio connection.

Accordingly, in one respect, the disclosed method may involve a mobile station maintaining correlation data that correlates a particular geographic region with a cellular coverage area that is at least partially within the geographic region. When the mobile station is on a call, the method may then involve the mobile station detecting an advanced-handoff trigger, wherein detecting the advanced-handoff trigger comprises determining (i) that the mobile station is at or approaching the geographic region, (ii) that the correlation data correlates the geographic region with the cellular coverage area, and (iii) that the mobile station does not yet have a radio connection in the cellular coverage area.

In turn, the method may then involve, in response to detecting the advanced-handoff trigger, (a) the mobile station transmitting to a serving radio access network (RAN) a handoff request that causes the RAN to assign to the mobile station a radio connection in the cellular coverage area and (b) the mobile station including with the handoff request an advanced-handoff indication that causes the RAN to maintain assignment of the radio connection assignment to the mobile station for longer than normal before the RAN receives a communication from the mobile station over that radio connection.

Further, the method may involve the RAN receiving the handoff request from the mobile station and the RAN responding to the handoff request by assigning to the mobile station the radio connection (i.e., a radio connection) in the cellular coverage area. Further, the method may involve the RAN responding to the advanced-handoff indication that the mobile station included with the handoff request, by maintaining assignment of radio connection assignment to the mobile station for longer than normal before receiving a communication from the mobile station over that radio connection.

In another respect, a corresponding apparatus may take the form of a mobile station having a wireless communication interface for engaging in air interface communication with a serving radio access network, a processor, data storage, and logic executable by the processor to carry out various mobile station functions described herein.

For instance, the logic may be executable by the processor (i) to determine that, at a geographic area, when the mobile station is operating on one or more first sectors but not operating on a second sector, the mobile station tends to experience a call drop followed by the mobile station idling on the second sector, and (ii) to record in the data storage a correlation between at least the geographic area and the second sector.

Further, the logic may be executable by the processor (i) to detect that, when the mobile station is on a call, the mobile station is at or approaching the geographic area and is not operating on the second sector and (ii) responsive to the detecting and in view of the stored correlation data between the geographic area and the second sector, to (a) invoke a handoff of the call to the second sector by sending or triggering transmission via the wireless communication interface to the serving radio access network a handoff request message designating the second sector and (b) include in the handoff request message an advanced-handoff indication comprising data interpretable by the serving radio access network to indicate that the handoff of the call to the second sector is an advanced handoff.

These as well as other aspects, advantages, and alternatives will become apparent to those of ordinary skill in the art by reading the following detailed description, with reference where appropriate to the accompanying drawings. Further, it should be understood that the description provided in this overview and below is intended to illustrate the invention by way of example only and not by way of limitation.

DETAILED DESCRIPTION

Figure 1:
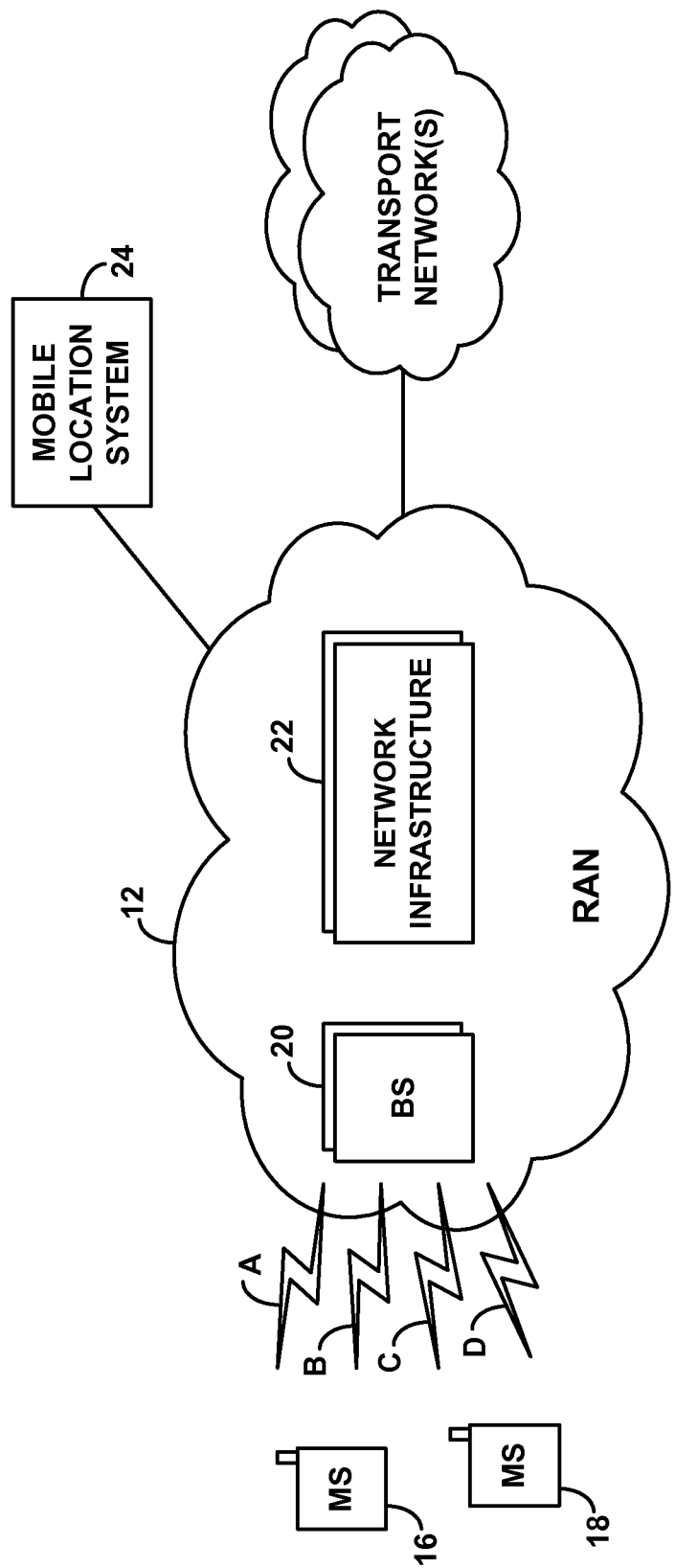
FIG. 1 is a simplified block diagram of a cellular communication system in which the method, apparatus, and system can be implemented.

Referring to the drawings, FIG. 1 depicts a cellular communication system in which aspects of the present disclosure can be implemented. It should be understood, however, that this and other arrangements and functions described herein are presented for purposes of example only, and that numerous variations are possible. For instance, elements can be added, omitted, combined, distributed, reordered, or otherwise modified. Further, where this disclosure mentions functions that can be carried out by one or more devices, systems, or other entities, it should be understood that the functions may be implemented by software (e.g., machine language instructions stored in data storage and executed by a processor), firmware, and/or hardware.

As shown in FIG. 1, the example communication system includes at its core a RAN 12 that is arranged to provide one or more mobile stations with wireless communication service and connectivity with one or more transport networks 14 such as the PSTN or the Internet. FIG. 1 depicts two representative mobile stations 16, 18 by way of example, either or each of which could be a cell phone, wirelessly equipped PDA, or other type of wirelessly-equipped device now known or later developed. Each mobile station is equipped with hardware, software, and/or other logic to communicate with RAN 12 in a known manner in accordance with an agreed communication protocol, such as CDMA (e.g., IS-95, IS-2000, 1xRTT, 1xEV-DO, etc.), LTE, WiMAX, IDEN, TDMA, AMPS, GSM, GPRS, UMTS, EDGE, or any other communication protocol now known or later developed.

RAN 12 defines a plurality of sectors (i.e., any wireless coverage areas established by reference to base station emissions or the like) in which mobile stations can communicate with the RAN. By way of example, FIG. 1 shows the RAN radiating to define four representative sectors, labeled respectively A, B, C, and D. The RAN may define these sectors discretely through use of directional antennas and/or by various modulation parameters, including, without limitation, carrier frequencies and pseudo-random number offsets or other parameters, depending on the air interface protocol used. In practice, the sectors may overlap to some extent, so that a served mobile station can communicate with multiple sectors when at particular location.

The RAN can take various forms and may include any of a variety and number of components, depending for instance on the air interface protocol employed by the RAN. As shown, the RAN may include one or more base stations 20 and associated network infrastructure 22 such as one or more base station controllers, radio network controllers, switches, gateways, mobility management entities, or the like. The base stations 20 preferably include directional antennas, power amplifiers, and associated transceiver equipment arranged to establish the sectors shown and to communicate with served mobile stations. As such, some or all of sectors A, B, C, and D may emanate from a single base station (i.e., a single cell site), or various ones of the sectors may emanate from separate base stations.

In general, the air interface of each sector in the RAN may define a downlink for carrying communications wirelessly from the base station to mobile stations and an uplink for carrying communications wirelessly from the mobile stations to the base station. These links may be distinguished from each other through frequency division duplexing, time division duplexing, or in some other manner. Further, each link may support various control and bearer traffic communication between the base station and served mobile stations, with such communications being distinguished from each other through time division multiplexing, code division multiplexing, frequency division multiplexing, or in some other manner. By way of example, the downlink may support transmission of a downlink pilot or reference signal, page messages and other overhead information, and bearer traffic, and the uplink may support transmission of uplink pilot signals, access probes such as registration requests, connection requests, and handoff requests, and bearer traffic.

When a mobile station powers on or first enters into coverage of RAN 12, the mobile station may scan for pilot or reference signals and may idle in the sector providing the strongest such signal (e.g., the pilot or reference signal having the strongest signal-to-noise ratio measured by the mobile station).

When the mobile station then seeks to engage in a call (e.g., voice call or data session), initiated by the mobile station or by a page from the RAN, the mobile station may then transmit a connection request to the base station serving that sector, and the base station may assign to the mobile station a radio connection on which the mobile station may engage in the call. Assignment of this radio connection may involve reservation of various network resources that can be used to carry or facilitate the call communication. For instance, assignment of the radio connection may involve reserving a dedicated air interface traffic channel on the downlink and/or uplink, establishing a context record for the connection, reserving backhaul capacity (such as one or more bearer channels between the base station and the network infrastructure), or the like. Further, the RAN may then assist in setting up the call if appropriate, such as by engaging call setup signaling for instance.

As noted above, when a mobile station is engaged in a call, the mobile station may continue to monitor pilot or reference signals in search of the best (e.g., strongest) available sector. Upon detecting a sufficiently strong other sector, the mobile station may then transmit to the RAN a request to hand off to that base station. This handoff request may take the form of a radio environment report such as a pilot strength measurement message (PSMM) for instance that identifies the detected sector and the mobile station's currently serving sector. Depending on various factors, the RAN may then grant the handoff request by assigning to the mobile station a radio connection in the new sector, transferring the call to the new sector, and transmitting to the mobile station a handoff grant message that instructs the mobile station to proceed with the handoff. In normal practice, the mobile station may then transition to continue the call on the new sector.

The example communication system of FIG. 1 also includes a mobile positioning system that facilitates determination of the location of mobile stations in accordance with well known principles. As shown in FIG. 1, for instance, a mobile location system (MLS) 24 can be linked with a switch or RAN element via a signaling network and/or via a general packet-data network. The MLS 24 may function as a location server, able to maintain records of mobile station location and to report mobile station locations to querying entities. The MLS may determine the location of a mobile station through interaction with position determining equipment (not shown), which may be network-based (e.g., triangulation mechanisms) and/or handset-based (e.g., GPS-based).

For high precision location determination, the MLS 24 may engage in signaling with the mobile station itself, according to well known industry standard IS-801 for example. In that process, the mobile station may report base station signal measurements to the MLS, the MLS may use those measurements to determine roughly where the mobile station is located, and the MLS may then provide the mobile station with appropriate satellite assistance data to enable the mobile station to tune to particular satellites in its area. Based on signals that the mobile station then receives from those satellites, the mobile station or the MLS may then compute the mobile station's location with a high degree of accuracy. And the MLS may report that determined location to a querying entity. Further, some other entity (such as a RAN entity) may directly request the mobile station to report the mobile station's GPS-determined location, and the mobile station may compute its location by reference to satellite signals and then return its reported location to the querying entity.

As discussed above, the present disclosure may help to address a scenario where a mobile station is programmed to correlate a particular geographic region with a cellular coverage area, such that when the mobile station is on a call and is in or approaching the geographic region, the mobile station can automatically trigger handoff of the call to the corresponding cellular coverage area.

In practice, for instance, a mobile station may be provisioned with correlation data that defines one or more geographic regions (e.g., as polygons or other shapes bound by particular latitude/longitude coordinates, or perhaps a simple grid dividing an area into geographic regions) and correlates each geographic region with at least one sector that provides coverage within that geographic region.

A wireless service provider may provision the mobile station with such correlation data, based on engineering analysis of the geographic locations where sectors provide coverage. Alternatively, the mobile station may itself establish the correlation data over time, based on programmatic evaluation of the geographic positions where the mobile station is located when the mobile station is served by particular sectors. In an example implementation, for instance, each time the mobile station engages in a call served by a particular sector, the mobile station may determine its geographic location, determine or define the geographic region encompassing that location, and record a correlation between that geographic region and the sector. Further, in another implementation, each time the mobile station experiences a dropped call while being served by one or more sectors and then idles on particular sector, the mobile station may determine its geographic location, determine or define the geographic region encompassing that location, and record a correlation between that geographic region and the particular sector. In this way, the mobile station may build up data indicating, per geographic region, at least one sector on which the mobile station tends to operate when the mobile station is located in that geographic region.

Such correlation data may help the mobile station to proactively hand off to a sector when the mobile station is in or approaching a geographic region correlated with the sector. In practice, for example, when the mobile station is on a call, the mobile station may monitor its geographic location, possibly determining both its current geographic location and its trajectory based on its movement over time and/or on mapping data representing streets or other paths for instance, and the mobile station may refer to the correlation data. When the mobile station thereby determines that it has entered or is approaching (e.g., moving toward and within some defined threshold short distance from) a particular geographic region, the mobile station may determine from the correlation data that the geographic region is correlated with a particular sector on which the mobile station is not yet operating. In response, the mobile station may then transmit to the RAN a handoff request, requesting handoff to that particular sector, and the RAN may grant the handoff request, assigning to the mobile station a radio connection in the indicated sector.

As noted above, a problem can arise in this process if it takes too long for the mobile station to begin communicating with the RAN in the new sector. In particular, to conserve resources, the RAN may be set to automatically release a radio connection assigned to a mobile station if the RAN does not receive communication (e.g., uplink bearer communication, uplink access communication and/or uplink pilot or reference signal) from the mobile station on that radio connection within a threshold period of time after the RAN assigns the radio connection. This normal mode of operation may pose an issue if the sector in which the RAN assigned a radio connection to the mobile station does not actually span the entire geographic region that triggered the handoff. In that scenario, the mobile station may enter the geographic region but might not actually be within coverage of the sector for possibly quite some time.

Figure 2:
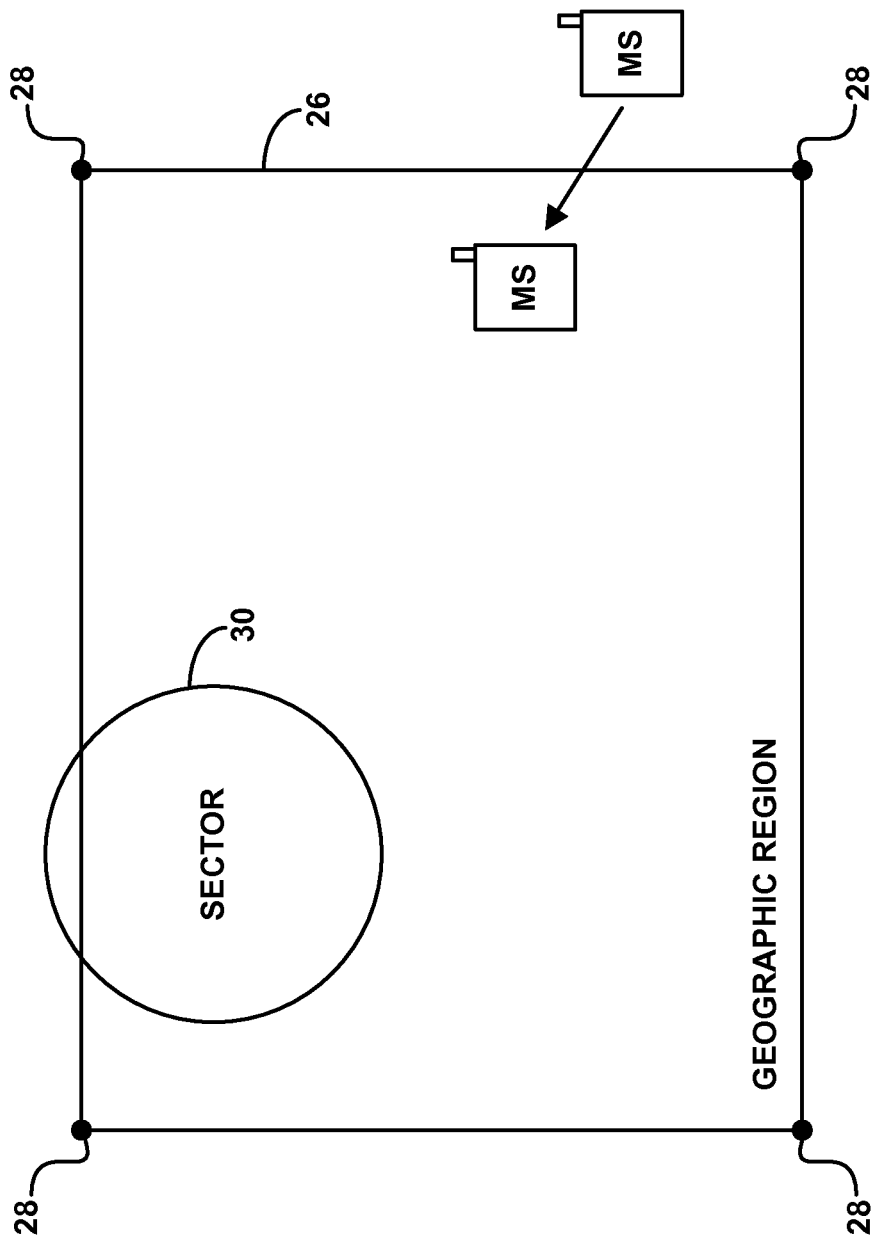
FIG. 2 depicts a representative cellular coverage area that is at least partially within a defined geographic region but does not fill the entire region.

FIG. 2 depicts such an arrangement by way of example. In particular, FIG. 2 depicts a representative geographic region 26, which the correlation data may define as a polygon having vertices 28 at particular latitude/longitude coordinates. Shown at least partially within the geographic region 26 is then a coverage area provided by a representative sector 30 of the RAN, which the correlation data may associate with the geographic region 26. As the mobile station approaches or enters into this geographic region 26, the mobile station may thus determine by reference to the correlation data that the geographic region corresponds with sector 30, and the mobile station may thus request handoff to sector 30 and receive assignment of a radio connection in the sector.

As is evident in this arrangement, the coverage area of sector 30 does not span the full geographic region but rather extends only within a portion of the region. Thus, if the mobile station continues on its illustrated trajectory, there will be some delay before the mobile station is within the sector and the RAN begins receiving communication from the mobile station on the assigned radio connection. Depending on the particular arrangement and the mobile station's speed of movement, there is therefore a chance that the RAN may not begin receiving communication from the mobile station within the threshold time period that the RAN normally waits after assigning a radio connection. As a result, the RAN may then consider the handoff to have failed and may release the assigned radio connection.

As noted above, the present disclosure helps to avoid this problem by having the mobile station in such a scenario provide an advanced-handoff indication with its handoff request. The advanced-handoff indication may comprise a defined parameter (e.g., a code or flag) that the RAN is arranged to interpret as a request to maintain the radio connection assignment for longer than the RAN would normally. Thus, in a scenario where a mobile station is on a call and detects that it is in or approaching a geographic region corresponding with a particular sector, and the mobile station responsively requests handoff to that sector and receives an assignment of a radio connection in the sector, the mobile station may include in its handoff request the advanced-handoff indication, to allow more time for the mobile station to move into coverage of the sector and begin communication on the assigned radio connection.

Figure 3:
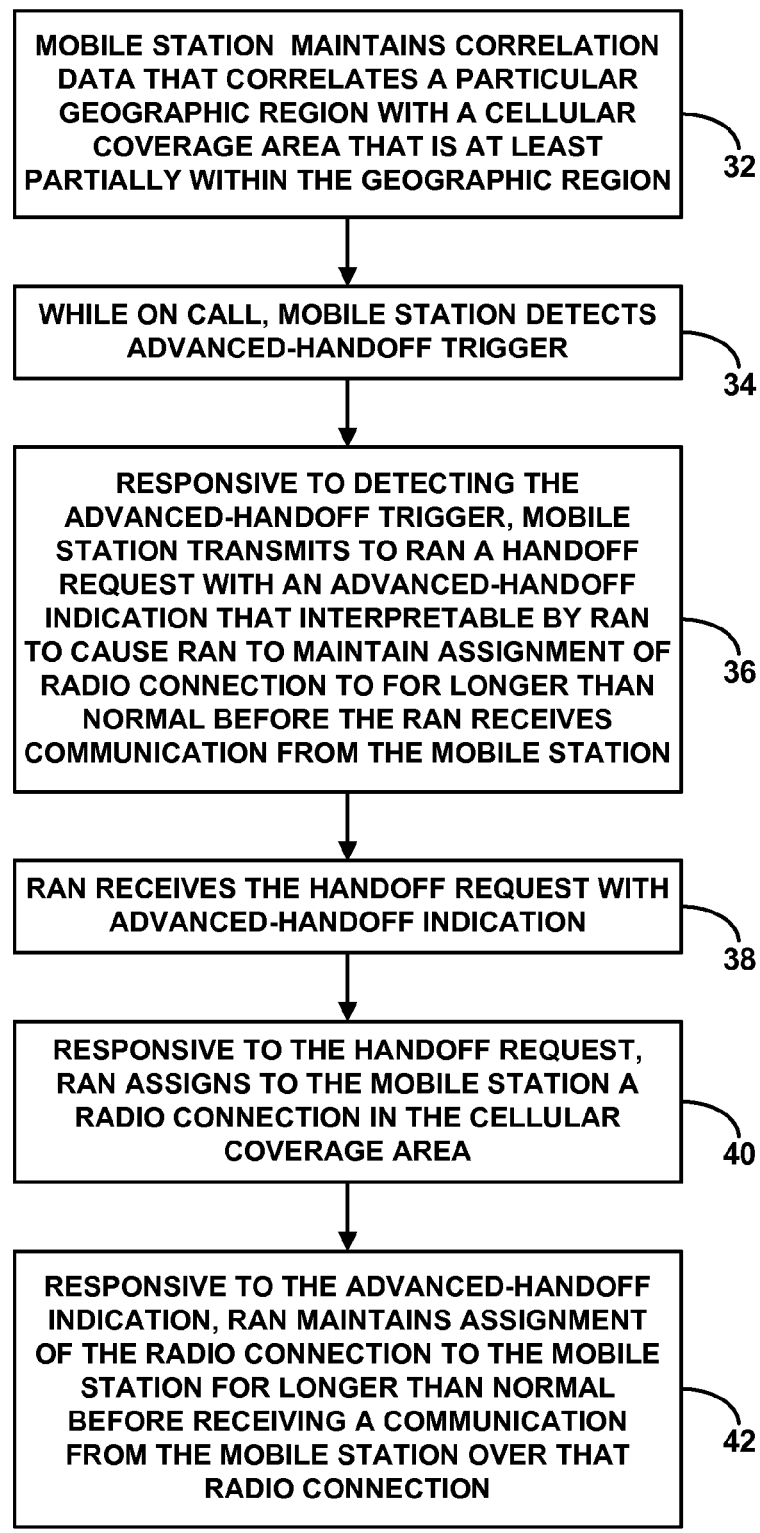
FIG. 3 is a flow chart depicting functions that can be carried out in accordance with the present disclosure.

FIG. 3 is a flow chart depicting an example of this process. As shown in FIG. 3, at block 32, the mobile station maintains correlation data that correlates a particular geographic region with a cellular coverage area that is at least partially within the geographic region. As discussed above, for instance, the mobile station may establish the correlation data in response to the mobile station detecting that when the mobile station is at the geographic area and is served by one or more other cellular coverage areas, the mobile station tends to experience a call drop followed by the mobile station idling on the cellular coverage area.

At block 34, when the mobile station is on a call, the mobile station detects an advanced-handoff trigger. In particular, detecting the advanced-handoff trigger may include determining (i) that the mobile station is at or approaching the geographic region, (ii) that the correlation data correlates the geographic region with the cellular coverage area, and (iii) that the mobile station does not yet have a radio connection in the cellular coverage area.

In practice, for instance, the mobile station may monitor its geographic location and thereby determine that it is in or approaching (e.g., moving along a path toward and being within a threshold short distance from) the geographic region. The mobile station may then determine from the correlation data that the correlation data correlates the geographic region with the cellular coverage area. And the mobile station may determine that it is not being served by the cellular coverage area, such that its sole serving coverage area is not the cellular coverage area at issue, or, where it has an active set of cellular coverage areas for the call, that the active set does not include the cellular coverage area at issue.

Further, detecting the advanced-handoff trigger may include determining that the mobile station is not currently detecting signaling from the cellular coverage area, such as where the mobile station has not detected a pilot or reference signals from the coverage area. Thus, the detecting of the advanced-handoff trigger may occur at a time when the mobile station is not detecting signaling from the cellular coverage area that would normally suffice to trigger a handoff to the cellular coverage area (e.g., that would be threshold strong enough or sufficiently stronger than strength from the mobile station's current serving coverage area).

At block 36, in response to detecting the advanced-handoff trigger, the mobile station then transmits to a serving RAN a handoff request that causes the RAN to assign to the mobile station a radio connection in the cellular coverage area and the mobile station includes with the handoff request an advanced-handoff indication that causes the RAN to maintain assignment of the radio connection to the mobile station for longer than normal before the RAN receives a communication from the mobile station over that radio connection. As the correlation data serves as a basis to trigger the handoff, the mobile station may transmit this handoff request without the mobile station having (i) scanned for coverage and (ii) thereby detected the cellular coverage area as the target coverage area for the handoff request.

In line with the discussion above, the RAN in this process may be arranged such that once the RAN assigns a given radio connection, the RAN would normally release the given radio connection in response to the RAN not receiving communication over the given radio connection by a threshold period of time after the RAN first makes the assignment. With the illustrated process, however, the advanced-handoff indication would advantageously cause the RAN to maintain assignment of the radio connection to the mobile station for longer than that threshold period of time even without yet receiving communication from the mobile station over the assigned radio connection.

As further shown in FIG. 3, at block 38, the RAN thus receives the handoff request. For instance, the mobile station's currently serving base station (or one or more of the mobile station's currently serving base stations if multiple exist) may receive the handoff request. Further, the handoff request may pass to various network infrastructure, which may thus also receive the handoff request. And at block 40, responsive to the handoff request, the RAN then assigns to the mobile station a radio connection in the cellular coverage area. Further, in response to the advanced-handoff indication, the RAN maintains assignment of radio connection to the mobile station for longer than normal before receiving a communication from the mobile station over that radio connection, thus possibly leaving time for the mobile station to actually arrive at the coverage area and begin communicating on the radio connection.

Figure 4:
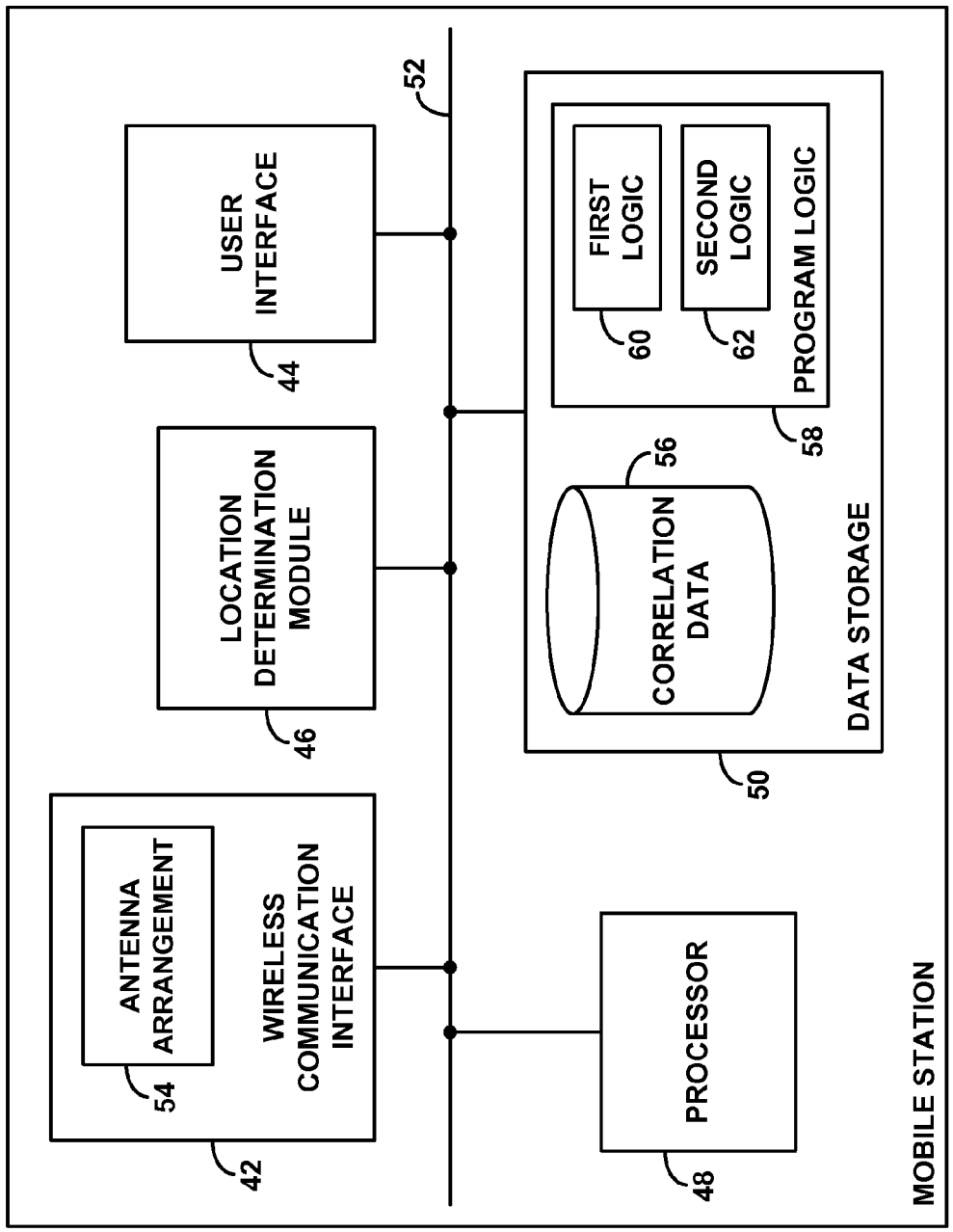
FIG. 4 is a simplified block diagram depicting functional components of a mobile station operable in the arrangement of FIG. 1.
Figure 5:
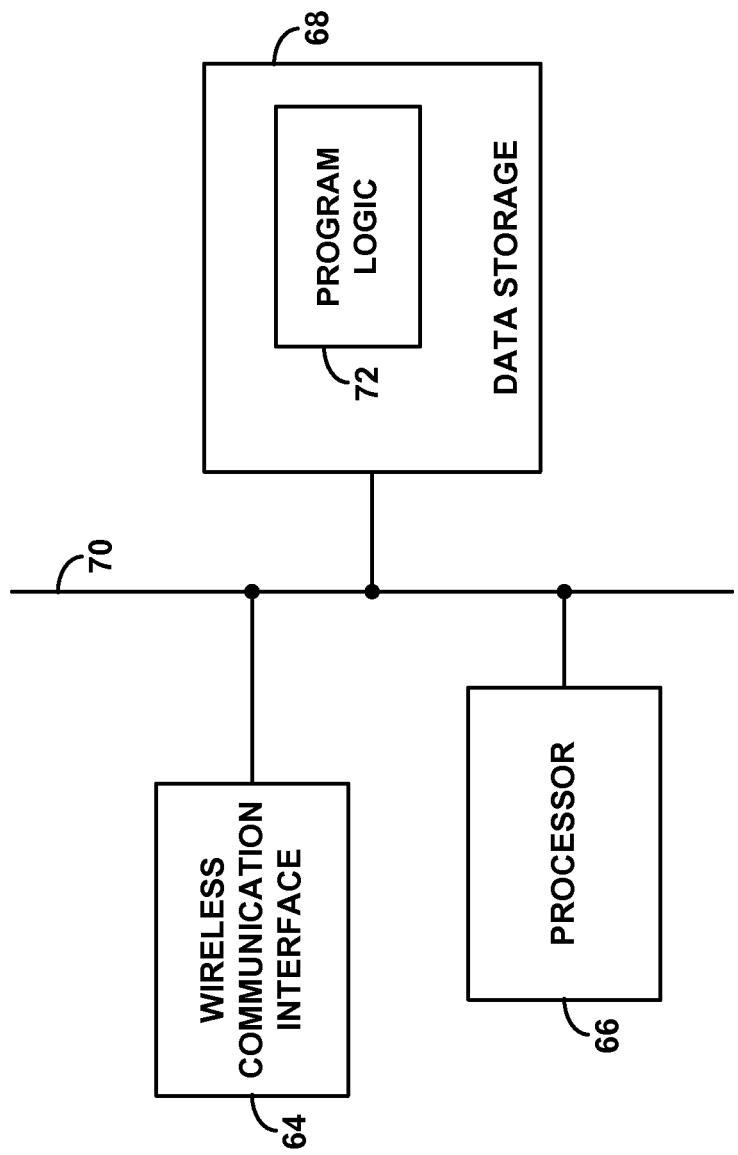
FIG. 5 is a simplified block diagram depicting functional components of a RAN operable in the arrangement of FIG. 1.

A representative implementation of the present method may thus focus on functions carried out by the mobile station and/or functions carried out by the RAN. FIGS. 4 and 5 are next simplified block diagrams showing components that may be included in the mobile station and the RAN to help facilitate implementation of the method in practice.

As shown in FIG. 4, an example mobile station may include a wireless communication interface 42, a user interface 44, a location-determination module 46, a processor 48, and data storage 50, all of which may be communicatively linked together by a system bus, network, or other connection mechanism 52. Although these components are shown with separate blocks, it should be understood that they could be integrated together in various ways. For example, the processor, location-determination module, and/or associated logic could be provided as part of the wireless communication interface. And as another example, the data storage could be provided as part of the processor. Other examples are possible as well.

Wireless communication interface 42 may comprise an antenna arrangement 54 and associated components such as a mobile station modem for instance, for engaging in communication with serving base stations 20 in accordance with an air interface protocol such as one or more of those noted above. User interface 44 may facilitate interaction with a user of the mobile station if applicable and may thus include output components such as a display screen, loudspeaker, and headphone jack, and input components such as a keypad, a touch-sensitive screen, and a camera. And location-determination module 46 may comprise a global-positioning-system (GPS) receiver that may function to receive satellite signals to facilitate determining the geographic location of the mobile station.

Processor 48 may then comprise one or more general purpose processors and/or one or more special-purpose processors, and data storage 50 may comprise one or more volatile and/or non-volatile storage components (such as magnetic, optical, flash or other non-transitory storage).

As shown, data storage 46 may hold correlation data 56, which, as discussed above may define various geographic regions and correlate each region with at least one cellular coverage area. Further, data storage 46 may hold program logic (e.g., computer instructions such as machine language instructions) 58, which may be executable by the processor to carry out various mobile station functions described herein.

By way of example, the program logic 58 may include first logic 60 that is executable by the processor to establish or update the correlation data. For instance, the first logic 60 may be executable by the processor (i) to determine that when the mobile station is at a geographic area and is operating on one or more first sectors but not operating on a second sector, the mobile station tends to experience a call drop followed by the mobile station idling on the second sector, and (ii) responsive to that determination, to record in the data storage a correlation between at least the geographic area and the second sector.

Further, the program logic may include second logic 62 that is executable by the processor to use the correlation data as a basis to trigger handoff and to provide an advanced-handoff indication. For instance, the second logic 62 may be executable by the processor (i) to detect that, when the mobile station is on a call, the mobile station is at or approaching the geographic area and is not operating on the second sector (e.g., that the mobile station is traveling along a path toward the geographic area and is threshold close to the geographic area) and (ii) responsive to the detecting and in view of the stored correlation data between the geographic area and the second sector, to (a) invoke a handoff of the call to the second sector by sending (e.g., providing for transmission by the wireless communication interface 42) to a serving RAN a handoff request message designating the second sector and (b) include in the handoff request message an advanced-handoff indication comprising data interpretable by the RAN to indicate that the handoff of the call to the second sector is an advanced handoff.

In line with the discussion above, the second logic may be executable by the processor to invoke handoff of the call to the second sector without the mobile station having detected signaling from the second sector sufficient to trigger the handoff. Optimally, the mobile station may be operating on an active set of sectors at this time, to help maintain continuity of the call the mobile station is not yet in coverage of the second sector. Further, the handoff request message may cause the RAN to assign a channel (e.g., air interface traffic channel) of the second sector to the mobile station, and the advanced-handoff indication may cause the RAN to maintain the channel assignment for longer than normal before the serving radio access network receives bearer data of the call on the assigned channel from the mobile station.

As shown next in FIG. 5, an example RAN may include various functional components, such as a wireless communication interface 64, a processor 66, and data storage 68, all of which may similarly be communicatively linked together by a system bus, network, or other connection mechanism 70. As with the mobile station, these components may be integrated together in various ways. Further, the components may be provided as part of or distributed among various RAN components such as those shown in FIG. 1 for instance.

Wireless communication interface 64 may comprise an antenna arrangement 66 and associated components such as a cell site modem for instance, for engaging in communication with served mobile stations in accordance with an air interface protocol such as one or more of those noted above. Processor 66 may then comprise one or more general purpose processors and/or one or more special-purpose processors, and data storage 68 may comprise one or more volatile and/or non-volatile storage components (such as magnetic, optical, flash or other non-transitory storage).

As shown, data storage may hold program logic 72, which may be executable by processor 66 to carry out various RAN functions described herein. For instance, the program logic may be executable, upon receipt by the RAN of a handoff request from a mobile station, to orchestrate handoff of the mobile station to a coverage area designated by the handoff request and thus to assign to the mobile station a radio connection in the designated coverage area. Further, the program logic may be executable to cause the RAN to normally release the assigned radio connection if more than a defined threshold period of time passes after the assignment without the RAN receiving communication on the radio connection from the mobile station. And the program logic may be executable, upon receipt of an advanced-handoff indication in the handoff request, to cause the RAN to wait longer than that threshold period of time after assigning the radio connection, so as to allow more time for the mobile station to arrive at the indicated coverage area.

Exemplary embodiments have been described above. Those of ordinary skill in the art will appreciate, however, that modifications to these embodiments may be made without deviating from the scope of the invention. Further, the disclosure of co-pending U.S. patent application Ser. No. 11/779,023, filed Jul. 17, 2007, is hereby incorporated herein by reference.

We claim:

1. A method comprising:
   a mobile station maintaining correlation data that correlates a particular geographic region with a cellular coverage area that is at least partially within the geographic region;
   when the mobile station is on a call and is not currently detecting signaling from the cellular coverage area, the mobile station detecting an advanced-handoff trigger, wherein detecting the advanced-handoff trigger comprises determining (i) that the mobile station is at or approaching the geographic region, (ii) that the correlation data correlates the geographic region with the cellular coverage area, and (iii) that the mobile station does not yet have a radio connection in the cellular coverage area; and
   responsive to detecting the advanced-handoff trigger, (a) the mobile station transmitting to a radio access network (RAN) that provides the cellular coverage area a handoff request that causes the RAN to assign to the mobile station a radio connection in the cellular coverage area and (b) the mobile station including with the handoff request an advanced-handoff indication that causes the RAN to maintain assignment of the radio connection to the mobile station for longer than normal before the RAN receives a communication from the mobile station over that radio connection,
   wherein normally when the RAN assigns a given radio connection, the RAN releases the given radio connection in response to the RAN not receiving communication over the given radio connection within a threshold period of time after first assigning the given radio connection, and
   wherein the advanced-handoff indication causes the RAN to maintain assignment of the radio connection to the mobile station for longer than the threshold period of time.

2. The method of claim 1, wherein detecting the advanced-handoff trigger further comprises determining that the mobile station is not currently detecting signaling from the cellular coverage area.

3. The method of claim 1, wherein detecting the advanced-handoff trigger occurs at a time when the mobile station is not detecting signaling from the cellular coverage area that would normally suffice to trigger a handoff to the cellular coverage area.

4. The method of claim 1, wherein the handoff request is a radio environment report that designates the cellular coverage area.

5. The method of claim 4, wherein the radio environment report is a pilot strength management message (PSMM).

6. The method of claim 1, wherein the cellular coverage area is a given cellular coverage area, the method further comprising:
the mobile station establishing the correlation data in response to the mobile station detecting that when the mobile station is at the geographic area and is served by one or more other cellular coverage areas, the mobile station tends to experience a call drop followed by the mobile station idling on the given cellular coverage area.

7. The method of claim 1, wherein the mobile station has an active set of cellular coverage areas for the call, and wherein the mobile station not yet having a radio connection in the cellular coverage area comprises the active set not including the cellular coverage area.

8. The method of claim 1, wherein the mobile station transmitting the handoff request occurs without the mobile station having (i) scanned for coverage and (ii) thereby detected the cellular coverage area as a target for the handoff request.

9. The method of claim 1, further comprising:
   receiving the handoff request at the RAN;
   responsive to the handoff request, the RAN assigning to the mobile station the radio connection in the cellular coverage area; and
   responsive to the advanced-handoff indication, the RAN maintaining assignment of radio connection assignment to the mobile station for longer than normal before receiving a communication from the mobile station over that radio connection.

10. The method of claim 1, wherein determining that the mobile station is at or approaching the geographic area comprises determining that the mobile station is traveling along a path toward the geographic area and is threshold close to the geographic area.

11. The method of claim 1, wherein determining that the mobile station is at or approaching the geographic area comprises determining that the mobile station is in the geographic area.

12. A method comprising:
   receiving into a radio access network (RAN) a handoff request from a mobile station served by the RAN, the handoff request requesting the RAN to assign to the mobile station a radio connection in a cellular coverage area and providing the RAN with an advanced-handoff indication;
   responsive to the handoff request, the RAN assigning to the mobile station a radio connection in the cellular coverage area; and
   responsive to the request providing the advanced-handoff indication, the RAN maintaining assignment of the radio connection to the mobile station for longer than normal before the RAN receives communication from the mobile station over that radio connection,
   wherein normally when the RAN assigns a given radio connection, the RAN releases the given radio connection in response to the RAN not receiving communication over the given radio connection within a threshold period of time after first assigning the given radio connection, and
   wherein the advanced-handoff indication causes the RAN to maintain assignment of the radio connection assignment to the mobile station for longer than the threshold period of time.

13. The method of claim 12, wherein the handoff request is a radio environment report that designates the cellular coverage area.

14. The method of claim 13, wherein the radio environment report is a pilot strength management message (PSMM).

15. A mobile station comprising:
- a wireless communication interface for engaging in air interface communication with a serving radio access network defining one or more first sectors and a second sector;
- a processor;
- data storage;
- first logic executable by the processor (i) to determine that, when the mobile station is at a geographic area and is operating on the one or more first sectors but not operating on the second sector, the mobile station tends to experience a call drop followed by the mobile station idling on the second sector, and (ii) to record in the data storage a correlation between at least the geographic area and the second sector; and
- second logic executable by the processor (i) to detect that, when the mobile station is on a call, the mobile station is at or approaching the geographic area and is not operating on the second sector and (ii) responsive to the detecting and in view of the stored correlation data between the geographic area and the second sector, to (a) invoke a handoff of the call to the second sector by sending or triggering transmission via the wireless communication interface to the serving radio access network a handoff request message designating the second sector and (b) include in the handoff request message an advanced-handoff indication comprising data interpretable by the serving radio access network to indicate that the handoff of the call to the second sector is an advanced handoff,
- wherein the handoff request message causes the serving radio access network to assign a channel of the second sector to the mobile station,
- wherein the advanced-handoff indication causes the serving radio access network to maintain the channel assignment for longer than normal before the serving radio access network receives bearer data of the call on the channel from the mobile station, and
- wherein the second logic is executable to invoke the handoff of the call to the second sector without the mobile station having detected signaling from the second sector sufficient to trigger the handoff.

16. The mobile station of claim 15, wherein the second logic is executable to detect that the mobile station is at or approaching the geographic area by detecting that the mobile station is traveling along a path toward the geographic area and is threshold close to the geographic area.

\* \* \* \* \*